United States Patent
Kumar et al.

(10) Patent No.: US 11,983,178 B2
(45) Date of Patent: May 14, 2024

(54) TECHNIQUES FOR BUILDING DATA LINEAGES FOR QUERIES

(71) Applicant: Capital One Services, LLC, McLean, VA (US)

(72) Inventors: Srinivas Kumar, Chennai (IN); Aravind Birudu, Andhra Pradesh (IN); Rajeev Tiwari, Bangalore (IN); Puneet Goyal, Bangalore (IN)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/241,134

(22) Filed: Apr. 27, 2021

(65) Prior Publication Data
US 2022/0342884 A1 Oct. 27, 2022

(51) Int. Cl.
G06F 15/16 (2006.01)
G06F 16/2453 (2019.01)
G06F 16/901 (2019.01)

(52) U.S. Cl.
CPC .... G06F 16/24535 (2019.01); G06F 16/9024 (2019.01)

(58) Field of Classification Search
None
See application file for complete search history.

(56) References Cited

U.S. PATENT DOCUMENTS

| | | | | |
|---|---|---|---|---|
| 10,481,961 | B1 * | 11/2019 | Chapin | G06F 9/54 |
| 2007/0112736 | A1 * | 5/2007 | Okamoto | G06F 16/2454 |
| 2010/0299339 | A1 * | 11/2010 | Kementsietsidis | G06F 16/22 707/759 |
| 2011/0137922 | A1 * | 6/2011 | Cushing | G06F 16/24542 707/755 |
| 2013/0332423 | A1 * | 12/2013 | Puri | G06F 16/35 707/687 |
| 2014/0379665 | A1 * | 12/2014 | Benjamin | G06Q 40/00 707/769 |
| 2015/0012478 | A1 * | 1/2015 | Mohammad | G06F 16/254 707/602 |
| 2017/0033971 | A1 * | 2/2017 | Radivojevic | H04L 41/145 |
| 2019/0004775 | A1 * | 1/2019 | Vasisht | G06F 11/3624 |
| 2020/0142990 | A1 * | 5/2020 | Freedman | G06F 16/2455 |
| 2020/0334277 | A1 * | 10/2020 | Doyle | G06F 16/245 |
| 2020/0356599 | A1 * | 11/2020 | Xia | G06F 16/287 |
| 2021/0326366 | A1 * | 10/2021 | Chandrahasan | G06F 16/3326 |
| 2021/0349910 | A1 * | 11/2021 | Chadha | G06F 16/9024 |

OTHER PUBLICATIONS

Author Unknown, "Collibra Data Lineage", Collibra, https://www.collibra.com/data-lineage, retrieved from the internet on Apr. 26, 2021, 8 pages.

* cited by examiner

*Primary Examiner* — Alex Gofman
(74) *Attorney, Agent, or Firm* — KDW Firm PLLC (57) ABSTRACT

Various embodiments are generally directed to techniques for building data lineages for queries, such as SQL queries. Some embodiments are particularly directed to a lineage tool that is able to construct data lineages in a recursive manner that uses the text of a query to identify dependent tables. In several embodiments, the data lineage tool may parse SQL queries to identify columns and dependent tables, including analyzing interdependent queries used to populate dependent tables and proceeding until the true source of data is identified. In several embodiments, the data lineage tool may utilize the relationships and dependencies to build element and table level lineages.

16 Claims, 7 Drawing Sheets

TECHNIQUES FOR BUILDING DATA LINEAGES FOR QUERIES

FIELD

The present disclosure relates generally to the field of data bases and file management. In particular, the present disclosure relates to devices, systems, and methods for building data lineages for queries.

BACKGROUND

Data lineages give visibility and can facilitate the ability to trace errors back to the root cause, such as in a data analytics process. Data lineages may be prepared for a variety of different types of data. For example, data lineages may be prepared for search query language (SQL) queries. SQL is a domain-specific language used in programming and designed for managing data held in a relational database management system (RDBMS), or for stream processing in a relational data stream management system (RDSMS). Oftentimes SQL is utilized for handling structured data (i.e., data incorporating relations among entities and variables). SQL also enables the structured data to be queried.

SUMMARY

This summary is not intended to identify only key or essential features of the described subject matter, nor is it intended to be used in isolation to determine the scope of the described subject matter. The subject matter should be understood by reference to appropriate portions of the entire specification of this patent, any or all drawings, and each claim.

In one aspect, the present disclosure relates to an apparatus comprising a processor and a memory comprising instructions that when executed by the processor cause the processor to perform one or more of determine to build a lineage for a first query of historical data in a database; determine the first query is dependent on a second query of historical data in the database; identify a built lineage for the second query; retrieve the built lineage for the second query; and generate a built lineage for the first query based on the built lineage for the second query.

In various embodiments, the memory comprises instructions that when executed by the processor cause the processor to perform one or more of determine the first query is dependent on a third query; determine to build a lineage for the third query in response to a failure to locate a built lineage for the third query; and generate the built lineage for the third query. In various embodiments, the memory comprises instructions that when executed by the processor cause the processor to perform one or more of determine the third query is dependent on the second query; and generate the built lineage for the third query based on the built lineage for the second query. In some embodiments, the memory comprises instructions that when executed by the processor cause the processor to generate the built lineage for the first query based on the built lineage for the second query and the built lineage for the third query. In many embodiments, the memory comprises instructions that when executed by the processor cause the processor to merge the built lineage for the first query into a lineage graph comprising at least a portion of the built lineage for the second query. In several embodiments, the memory comprises instructions that when executed by the processor cause the processor to determine the first query is dependent on the second query. In various embodiments, the memory comprises instructions that when executed by the processor cause the processor to add metadata to the built lineage for the first query. In various embodiments the memory comprises instructions that when executed by the processor cause the processor to merge the built lineage for the first query including the metadata added into a lineage graph. In many embodiments, the first and second queries comprise structured query language (SQL) queries.

In another aspect, the present disclosure relates to at least one non-transitory computer-readable medium comprising a set of instructions that, in response to being executed by a processor circuit, cause the processor circuit to perform one or more of determine to build a lineage for a first query of historical data in a database; determine the first query is dependent on a second query of historical data in the database; identify a built lineage for the second query; retrieve the built lineage for the second query; and generate a built lineage for the first query based on the built lineage for the second query.

Various embodiments comprise instructions that, in response to being executed by the processor circuit cause the processor circuit to perform one or more of determine the first query is dependent on a third query; determine to build a lineage for the third query in response to a failure to locate a built lineage for the third query; and generate the built lineage for the third query. Various embodiments comprise instructions that, in response to being executed by the processor circuit cause the processor circuit to perform one or more of determine the third query is dependent on the second query; and generate the built lineage for the third query based on the built lineage for the second query. Some embodiments comprise instructions that, in response to being executed by the processor circuit cause the processor circuit to generate the built lineage for the first query based on the built lineage for the second query and the built lineage for the third query. Several embodiments comprise instructions that, in response to being executed by the processor circuit cause the processor circuit to merge the built lineage for the first query into a lineage graph comprising at least a portion of the built lineage for the second query. Many embodiments comprise instructions that, in response to being executed by the processor circuit cause the processor circuit to parse the first query to determine the first query is dependent on the second query. Some embodiments comprise instructions that, in response to being executed by the processor circuit cause the processor circuit to add metadata to the built lineage for the first query. Some embodiments comprise instructions that, in response to being executed by the processor circuit cause the processor circuit to merge the built lineage for the first query including the metadata added into a lineage graph.

In yet another aspect, the present disclosure relates to a computer-implemented method comprising one or more of determining to build a lineage for a first query of historical data in a database; determining the first query is dependent on the second query of historical data in the database; identifying a built lineage for the second query; retrieving the built lineage for the second query; and generating a built lineage for the first query based on the built lineage for the second query.

In some embodiments, the computer-implemented method includes one or more of determining the first query is dependent on a third query; determining to build a lineage for the third query in response to a failure to locate a built lineage for the third query; and generating the built lineage for the third query. In some embodiments, the computer-implemented method includes one or more of determining the third query is dependent on the second query; and generating the built lineage for the third query based on the built lineage for the second query.

DETAILED DESCRIPTION

Various embodiments are generally directed to techniques for building data lineages for queries, such as SQL queries. Some embodiments are particularly directed to a lineage tool that is able to construct data lineages in a recursive manner that uses the text of a query to identify dependent tables. A data lineage typically includes the origin of data, what happens to it, and where it moves over time. In several embodiments, the data lineage tool may parse SQL queries to identify columns and dependent tables, including analyzing interdependent queries used to populate dependent tables and proceeding until the true source of data is identified. In several embodiments, the data lineage tool may utilize the relationships and dependencies to build element and table level lineages. These and other embodiments are described and claimed.

Many challenges face the generation of data lineages, such as the difficulty associated with producing lineages in a recursive manner. For example, existing systems may require an entire collection of SQL queries prior to generating data lineages. Requiring the entire collection of SQL queries prior to generating lineages can be technically infeasible in a production scenario because new queries are routinely introduced and existing queries are often modified pursuant business demands. Adding further complexity, existing systems may also need lineages for dependent tables in advance, requiring data lineages for all dependent tables to be built before a data lineage for a current query can be built. Such limitations can drastically reduce the usability and applicability of data lineage systems, contributing to inefficient systems, devices, and techniques with limited capabilities.

Various embodiments described hereby include a data lineage tool that utilizes the text of an SQL query to identify dependent tables and create a data lineage for the SQL query on-the-fly. In several embodiments, the data lineages may be created in a recursive manner without requiring the entire collection of SQL queries. In many embodiments, data lineages for dependent queries may be selectively built. In several embodiments, an SQL query may be utilized to create a list of dependent tables. In several embodiments, data lineages may be selectively built for dependent tables on the list without existing data lineages. Multiple embodiments may provide an enterprise lineage solution at a data element level, including data transformation logic for end-to-end usage in target platforms. In one or more embodiments, the data lineage tool may implement enterprise data management requirements for all high-priority usage (HPU) data sets. In various embodiments, the data lineage tool may simplify query analysis and/or debugging processes. In some embodiments, the data lineage tool may implement checks and controls for SQL production processes. In several embodiments, the data lineage tool may recognize data gaps in reporting. In several embodiments, the data lineage tool may identify and highlight data quality issues. In one or more embodiments, the data lineage tool may handle intra-query and inter-query lineages. In one or more embodiments, intra-query lineages may refer to the lineage of a single query while inter-query lineages refer to relationships between different queries.

In these and other ways, components/techniques described hereby may be utilized to identify data inaccuracies and vulnerabilities automatically and with high coverage and accuracy, resulting in several technical effects and advantages over conventional computer technology, including increased capabilities and improved performance. In various embodiments, one or more of the aspects, techniques, and/or components described hereby may be implemented in a practical application via one or more computing devices, and thereby provide additional and useful functionality to the one or more computing devices, resulting in more capable, better functioning, and improved computing devices. For example, a practical application may include a data lineage tool that recursively builds data lineages. In another example, a practical application may include determining dependent tables based on the text of an SQL query. Further, one or more of the aspects, techniques, and/or components described hereby may be utilized to improve the technical fields of data lineages, enterprise data management, and data quality.

In several embodiments, components described hereby may provide specific and particular manners to enable development, evaluation, management, and optimization of data lineages and SQL queries. In many embodiments, one or more of the components described hereby may be implemented as a set of rules that improve computer-related technology by allowing a function not previously performable by a computer that enables an improved technological result to be achieved. For example, the function allowed may include one or more of the specific and particular techniques disclosed hereby such as utilizing the text of a query to identify dependent tables.

With general reference to notations and nomenclature used hereby, one or more portions of the detailed description which follows may be presented in terms of program procedures executed on a computer or network of computers. These procedural descriptions and representations are used by those skilled in the art to effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in many cases, in any of the operations described hereby that form part of one or more embodiments. Rather, these operations are machine operations. Useful machines for performing operations of various embodiments include general purpose digital computers as selectively activated or configured by a computer program stored within that is written in accordance with the teachings hereby, and/or include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given.

Reference is now made to the drawings, whereby like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form to facilitate a description thereof. The intention is to cover all modification, equivalents, and alternatives within the scope of the claims.

Figure 1:
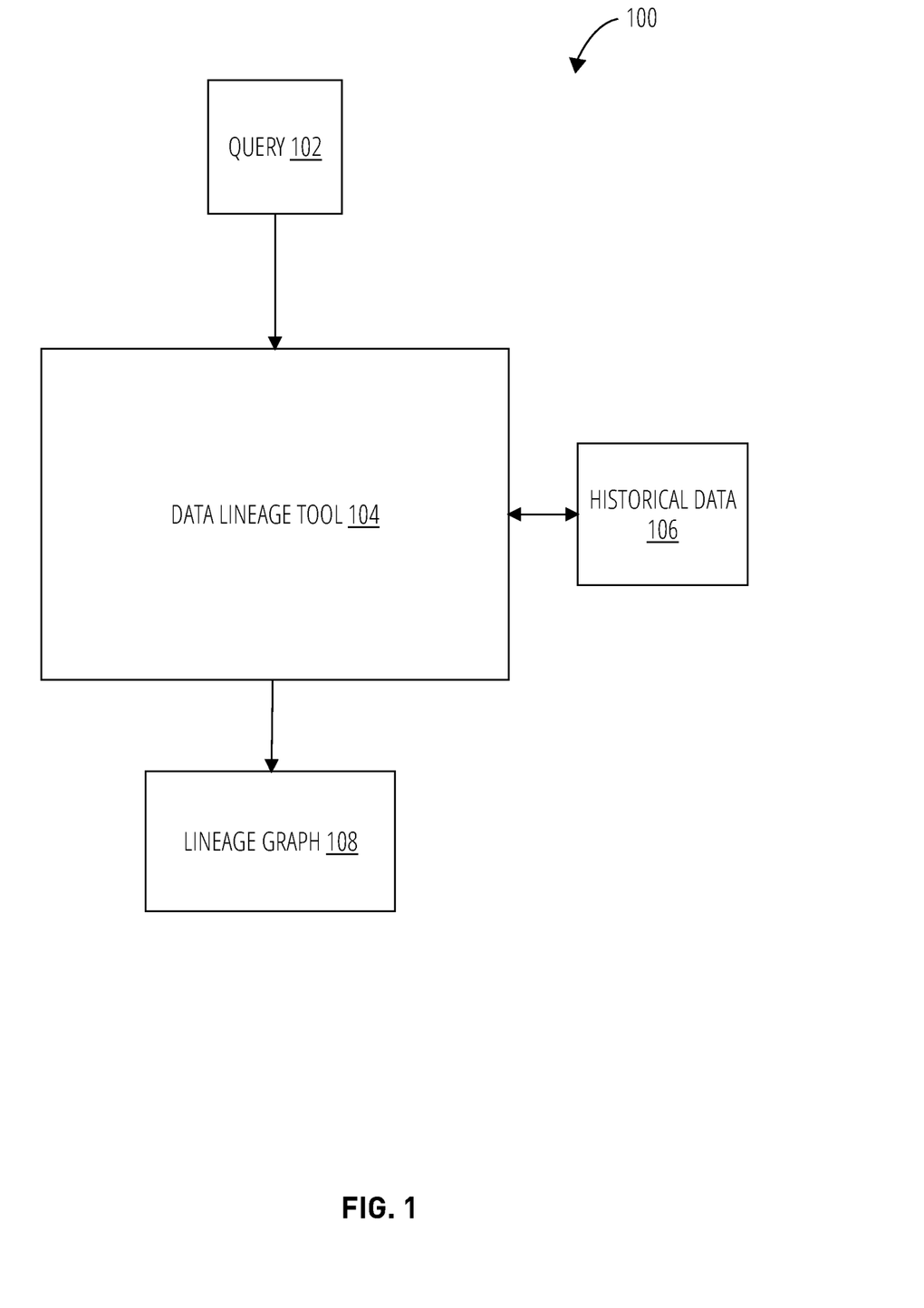
FIG. 1 illustrates an exemplary operating environment for a data lineage tool according to one or more embodiments described hereby.

FIG. 1 illustrates an exemplary operating environment 100 for a data lineage tool 104 according to one or more embodiments described hereby. Operating environment 100 may include a query 102, data lineage tool 104, historical data 106, and lineage graph 108. The data lineage tool 104 may construct lineage graph 108 based, at least in part, on query 102 and historical data 106. In various embodiments, data lineage tool 104 may utilize the text of query 102 to identify dependent tables for query 102. In various embodiments, data lineage tool 104 may retrieve lineages for one or more of the dependent tables from historical data 106. Alternatively, if no lineage exists for a dependent table, the data lineage tool 104 may construct a lineage for the dependent table. In some embodiments, FIG. 1 may include one or more components that are the same or similar to one or more other components of the present disclosure. Further, one or more components of FIG. 1, or aspects thereof, may be incorporated into other embodiments of the present disclosure, or excluded from the described embodiments, without departing from the scope of this disclosure. Still further, one or more components of other embodiments of the present disclosure, or aspects thereof, may be incorporated into one or more components of FIG. 1, without departing from the scope of this disclosure. Embodiments are not limited in this context.

More generally, query 102 may be created and submitted as part of generating a data report. For example, a query may be constructed to produce a global sales report table. To produce the global sales report table, data may be collected from sales report tables from each country (i.e., dependent sales report tables). To generate a data lineage for the global sales report, the data lineage tool 104 must determine the lineage for each data item pulled from the sale report tables from each country, which may be based on further dependent tables (e.g., regional sales report tables for each country). Accordingly, to construct data lineages for queries, dependent tables and corresponding data lineages are needed down to the true source of the data. In such examples, data lineage tool 104 may provide an end-to-end lineage solution at a data element level, including data transformation logic (e.g., summing regional sales to get country sales and summing country sales to get global sales). In many embodiments, each of the dependent tables may correspond to another query. In several embodiments, historical data 106 may be comprised in one or more of a data warehouse, a database, a distributed database, a set of enterprise data, a data collection, and the like.

Data lineage tool 104 may be used for a variety of purposes, such as meeting audit and/or regulatory requirements. For example, data lineage tool 104 may be used to generate lineages for SQL queries that are used to generate critical business reports. In some embodiments, data lineage tool 104 may be used for user behavior analysis. For example, data lineage tool 104 may be used to identify nonpublic personal information (NPI) query patterns and behaviors (table and columns). In another example, data lineage tool 104 may be utilized to detect if user-provided queries are making use of NPI or payment card information (PCI) data. In some such examples, the data lineage tool 104 may remove, obscure, and/or prevent retrieval of NPI and/or PCI results. In various such examples, the data lineage tool 104 may modify queries to avoid obtaining NPI and/or PCI results. In yet another example, data lineage tool 104 may be used to meet enterprise document management (EDM) audit requirements, such as by generating lineages for SQL queries that are used to calculate risk metrics. In one or more embodiments, the data lineage tool 104 may prevent access to or the use of data without a corresponding data lineage.

Figure 2:
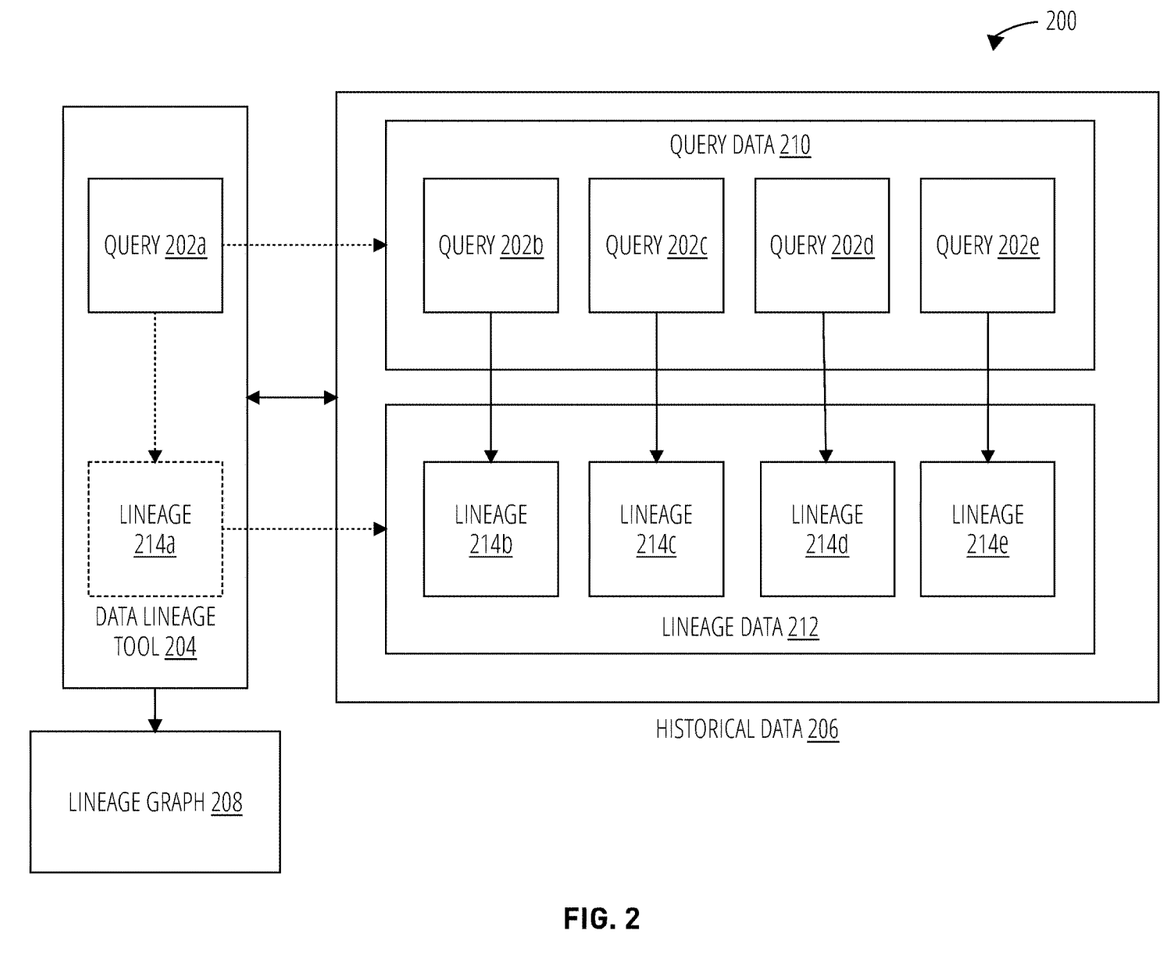
FIG. 2 illustrates an exemplary process flow for a data lineage tool according to one or more embodiments described hereby.

FIG. 2 illustrates an exemplary process flow 200 for a data lineage tool 204 according to one or more embodiments described hereby. Process flow 200 may illustrate utilizing historical data 206 to produce lineage 214a and generate, or update, lineage graph 208 based on query 202a. In the illustrated embodiment, historical data 206 includes query data 210 with queries 202b, 202c, 202d, and 202e and lineage data 212 with lineages 214b, 214c, 214d, 214e. Each of the lineages 214b, 214c, 214d, 214e may correspond to one of queries 202b, 202c, 202d, 202e. In some embodiments, a lineage may not exist for one or more queries in query data 210. In such cases, data lineage tool 204 may generate the missing lineage when the corresponding query results in a data table that query 202a is dependent on. In various embodiments, FIG. 2 may include one or more components that are the same or similar to one or more other components of the present disclosure. For example, data lineage tool 204 may be the same or similar to data lineage tool 104. Further, one or more components of FIG. 2, or aspects thereof, may be incorporated into other embodiments of the present disclosure, or excluded from the described embodiments, without departing from the scope of this disclosure. Still further, one or more components of other embodiments of the present disclosure, or aspects thereof, may be incorporated into one or more components of FIG. 2, without departing from the scope of this disclosure. Embodiments are not limited in this context.

Generally, data lineage tool 204 is directed to building data lineages for queries, such as SQL queries. More specifically, data lineage tool 204 may construct data lineages in a recursive manner that uses the text of a query (e.g., query 202*a*) to identify dependent tables associated with dependent queries. In several embodiments, the data lineage tool 204 may parse SQL queries to identify columns and dependent tables from query data 210, including analyzing interdependent queries used to populate dependent tables (e.g., one or more of queries 202*b*, 202*c*, 202*d*, 202*e*) and proceeding until the true source of data is identified. In several embodiments, the data lineage tool may utilize the relationships and dependencies to build element and table level lineages (e.g., lineages 214*a*).

In various embodiments, the data lineage tool 204 may focus on SQL code. In many embodiments, SWL queries may be parsed and lineage constructed automatically based on the relationship between data sources, database tables, columns, and conditional statements such as 'where' and 'group by' clauses. In one or more embodiments, the data lineage tool 204 may scan queries and define upstream dependencies by capturing relationships between tables, columns, and dependencies within queries and across queries for end-to-end lineage generation.

Figure 3:
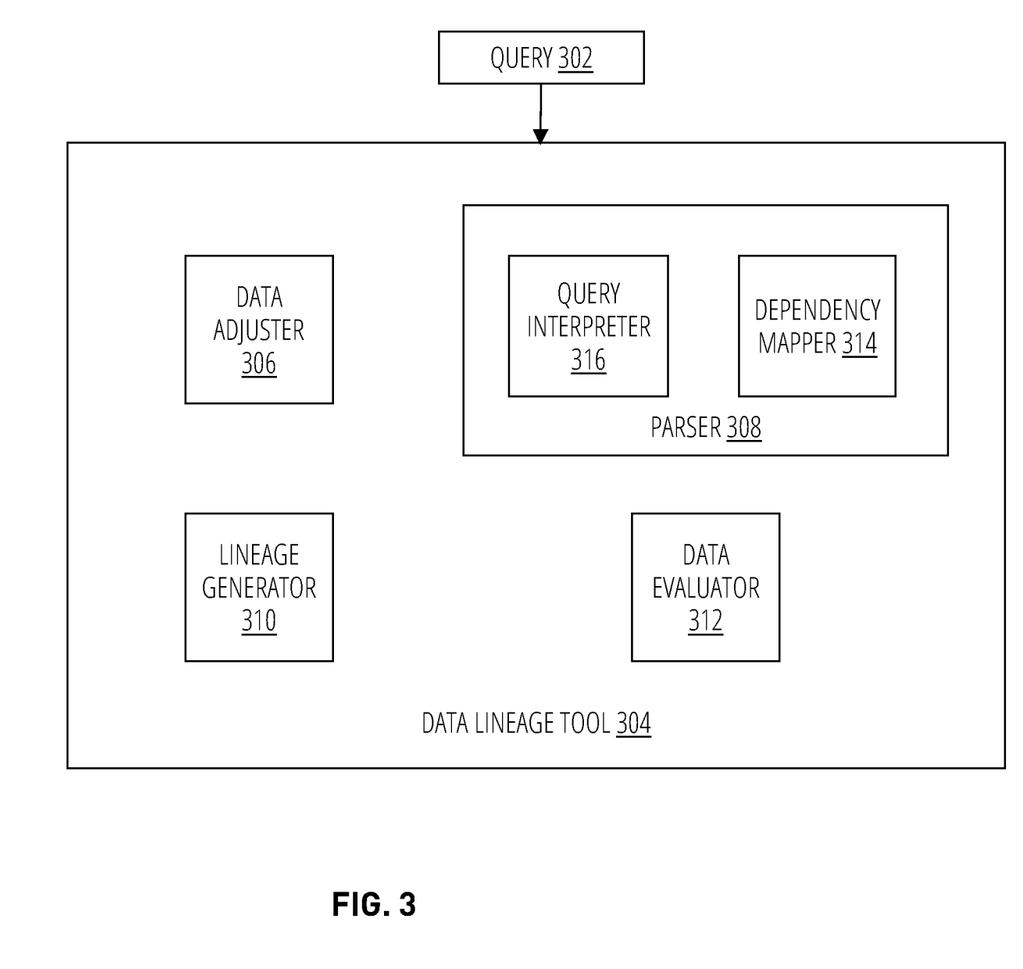
FIG. 3 illustrates exemplary aspects of a data lineage tool according to one or more embodiments described hereby.

FIG. 3 illustrates exemplary aspects of a data lineage tool 304 according to one or more embodiments described hereby. The data lineage tool 304 includes data adjuster 306, parser 308, lineage generator 310, and data evaluator 312. The parser 308 may include query interpreter 316 and dependency mapper 314. In some embodiments, FIG. 3 may include one or more components that are the same or similar to one or more other components of the present disclosure. For example, data lineage tool 304 may be the same or similar to data lineage tool 204 or query 302 may be the same or similar to query 202*a*. Further, one or more components of FIG. 3, or aspects thereof, may be incorporated into other embodiments of the present disclosure, or excluded from the described embodiments, without departing from the scope of this disclosure. For example, data lineage tool 304 may not include data adjuster 306 without departing from the scope of this disclosure. Still further, one or more components of other embodiments of the present disclosure, or aspects thereof, may be incorporated into one or more components of FIG. 3, without departing from the scope of this disclosure. Embodiments are not limited in this context.

In several embodiments, data adjuster 306 may receive query 302 as input. The data adjuster 306 may perform pre-processing on the query 302. For example, the data adjuster 306 may reformat query 302 from a first programming language into SQL. After pre-processing, parser 308 may identify a list of tables (and associated queries) that are dependent on query 302. For example, query interpreter 316 may interoperate with dependency mapper 314 to determine a list of dependent tables and associated queries based on the text of the query 302. For example, with reference to FIG. 2, dependency mapper 314 may determine query 302 is dependent on queries 202*a*, 202*b*, 202*d* with query 202*b* being dependent on query 202*d*. In one or more embodiments, the parser 308 (e.g., dependency mapper 314) may fetch lineages previously built for queries associated with tables in the list of dependent tables. Additionally, or alternatively, parser 308 may generate lineages for queries without existing lineages. In either case, lineages are only fetched for queries corresponding to dependent tables for query 302. In several embodiments, parser 308 may operate in conjunction with lineage generator 310 to parse queries and automatically generate lineages based on the relationship between data sources, database tables, columns, and conditional statements such as 'where' and 'group by' clauses. In one or more embodiments, query interpreter 316 may scan queries and dependency mapper 314 may define upstream dependencies by capturing relationships between tables, columns, and dependencies within queries and across queries for end-to-end lineage generation.

Once a lineage has been retrieved and/or built for each of the dependent tables determined by parser 308, lineage generator 310 may utilize the other lineages to build a data lineage for query 302. Additionally, data evaluator 312 may integrate the data lineage for query 302 into a lineage graph for a collection of queries (e.g., query data 210). In some embodiments, data evaluator 312 may add additional metadata into the lineage. For example, data evaluator 312 may add metadata regarding transformation logic associated with query 302 into the lineage. In another example, data evaluator 312 may add metadata regarding query 302 into the lineage.

Figure 4:
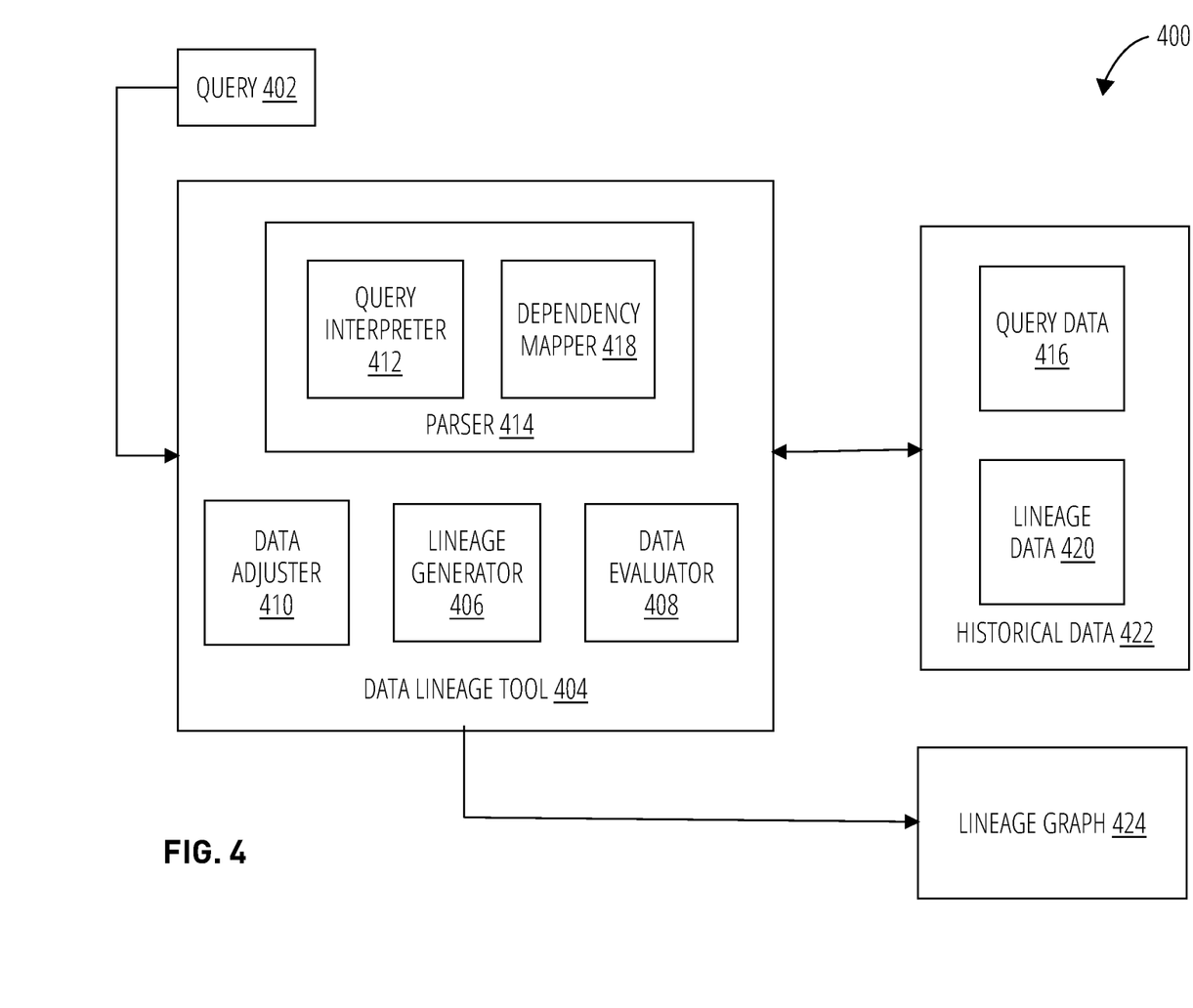
FIG. 4 illustrates an exemplary process flow for a data lineage tool according to one or more embodiments described hereby.

FIG. 4 illustrates an exemplary process flow 400 for a data lineage tool 404 according to one or more embodiments described hereby. Process flow 400 may illustrate data lineage tool 404 generating or updating lineage graph 424 based on query 402 utilizing historical data 422. In the illustrated embodiment, data lineage tool 404 includes lineage generator 406, data evaluator 408, data adjuster 410 and parser 414 with query interpreter 412 and dependency mapper 418. Historical data 422 includes query data 416 and dependency mapper 418. In some embodiments, FIG. 4 may include one or more components that are the same or similar to one or more other components of the present disclosure. For example, parser 414 may be the same or similar to parser 308. Further, one or more components of FIG. 4, or aspects thereof, may be incorporated into other embodiments of the present disclosure, or excluded from the described embodiments, without departing from the scope of this disclosure. For instance, data evaluator 408 may be removed from data lineage tool 404 without departing from the scope of this disclosure. Still further, one or more components of other embodiments of the present disclosure, or aspects thereof, may be incorporated into one or more components of FIG. 4, without departing from the scope of this disclosure. Embodiments are not limited in this context.

Figure 5:
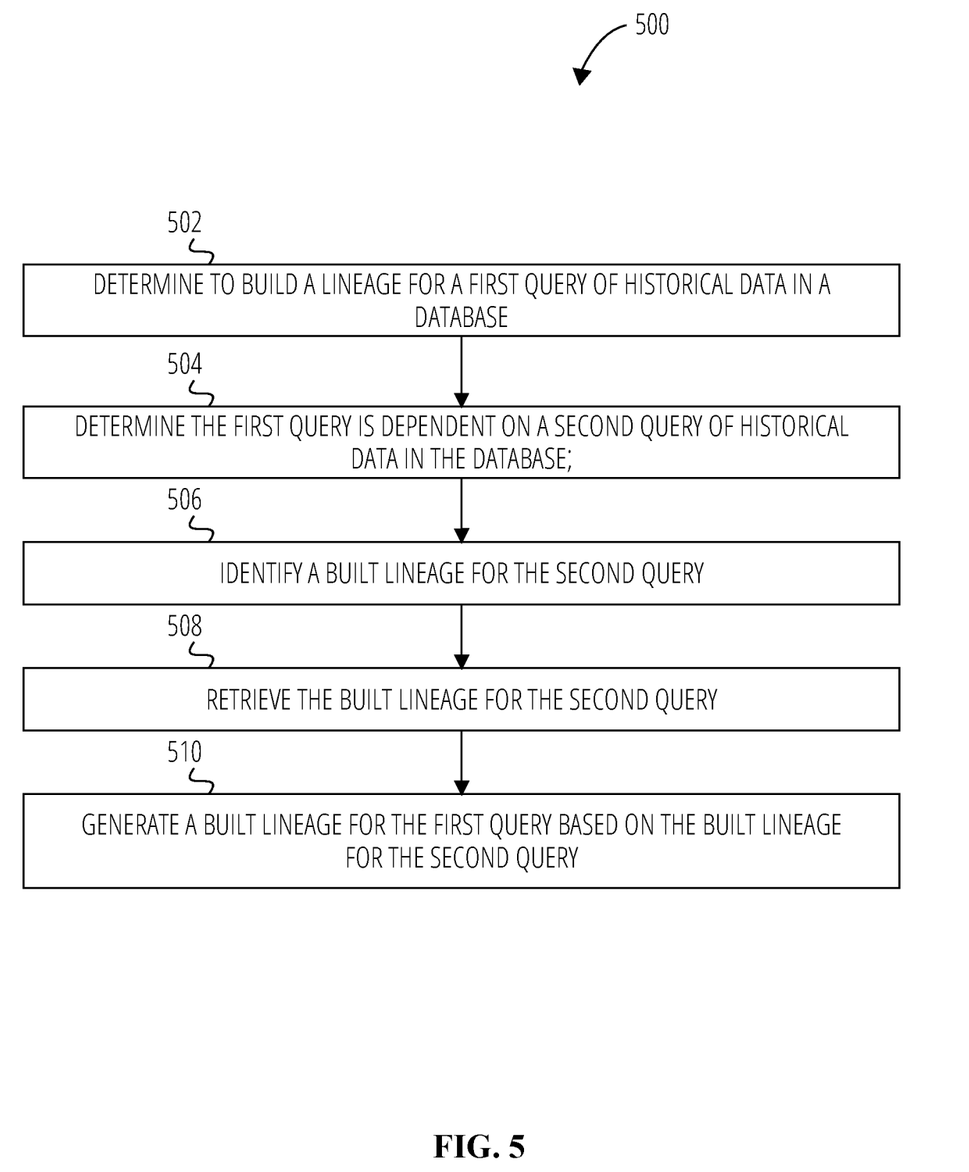
FIG. 5 illustrates an exemplary logic flow according to one or more embodiments described hereby.

FIG. 5 illustrates one embodiment of a logic flow 500, which may be representative of operations that may be executed in various embodiments in conjunction with techniques disclosed hereby. The logic flow 500 may be representative of some or all of the operations that may be executed by one or more components/devices/environments described herein, such as data lineage tool 104, lineage generator 310, or parser 414. The embodiments are not limited in this context.

In the illustrated embodiment, logic flow 500 may begin at block 502. At block 502 "determine to build a lineage for a first query of historical data in a database" a lineage for a first query of historical data in a database may be determined to be built. For example, data lineage tool 204 may determine to build a lineage 214*a* for query 202*a*. In some embodiments, parser 414 may determine to build a lineage for query 302 based on a failure to locate a lineage for query 302 in lineage data 420. Proceeding to block 504 "determine the first query is dependent on a second query of historical data in the database" the first query may be determined to be dependent on a second query of historical data in the database. For example, data lineage tool 204 may determine that query 202*a* is dependent upon query 202*c*. In some embodiments, dependency mapper 418 may determine query 402 is dependent upon another query.

Continuing to block 506 "identify a built lineage for the second query" a built lineage may be identified for the second query. For example, data lineage tool 204 may identify lineage 214*c* as a built lineage for query 202*c* after determining query 202*a* is dependent upon query 202*c*. At block 508 "retrieve the built lineage for the second query" the built lineage for the second query may be retrieved. For example, data lineage tool 204 may retrieve lineage 214*c* from lineage data 212 in historical data 206. Proceeding to block 510 "generate a built lineage for the first query based on the built lineage for the second query" a built lineage may be generated for the first query based on the built lineage for the second query. For example, data lineage tool 204 may generate lineage 214*a* for query 202*a* based on lineage 214*c* for query 202*c*. In some embodiments, lineage generator 406 may generate a lineage for query 402 based on one or more lineages in lineage data 420 identified by dependency mapper 418, such as based on the text of query 402.

Figure 6:
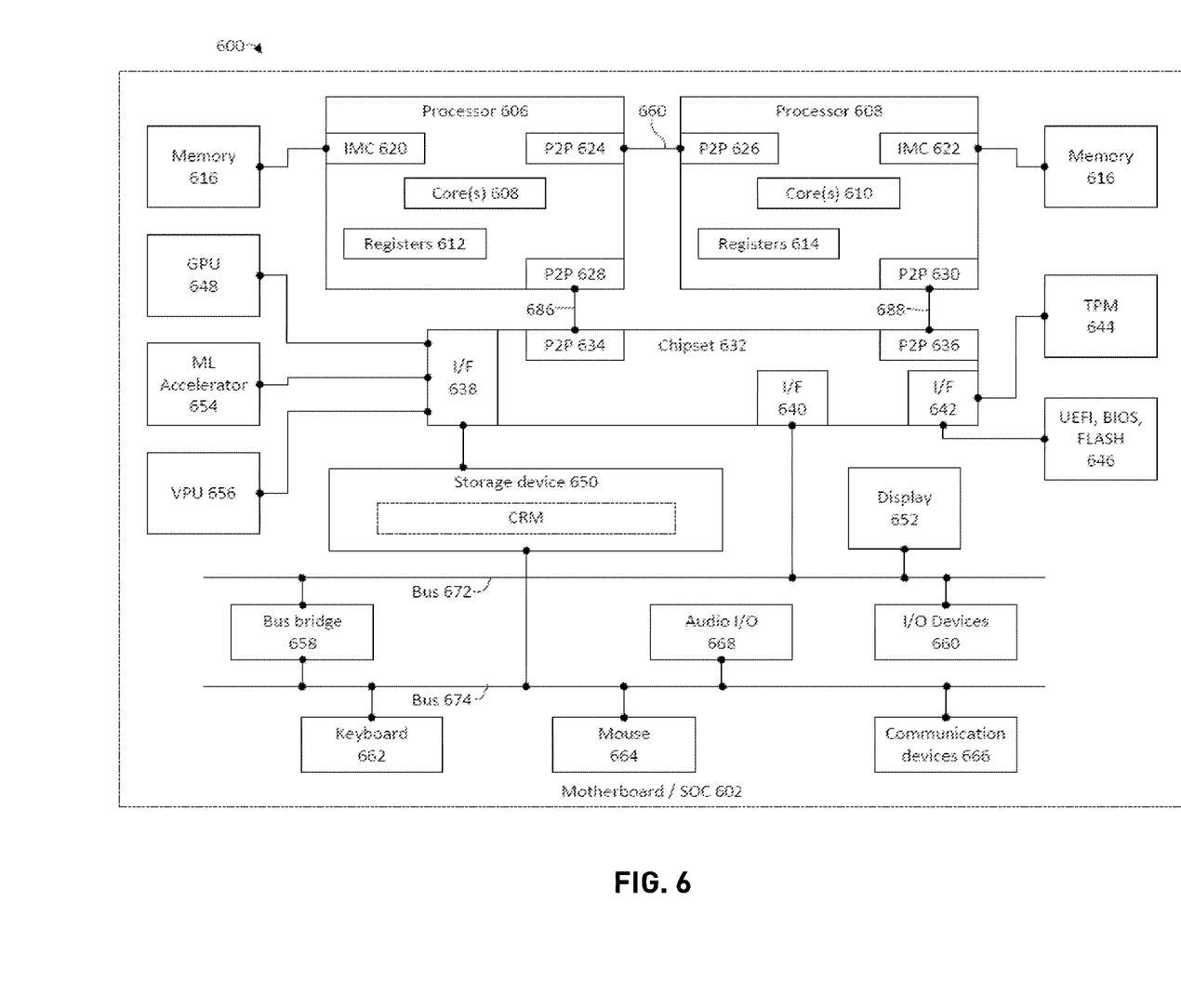
FIG. 6 illustrates exemplary aspects of a computing system according to one or more embodiments described hereby.

FIG. 6 illustrates an embodiment of a system 600 that may be suitable for implementing various embodiments described hereby. System 600 is a computing system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In many embodiments, the system 600 may have a single processor with one core or more than one processor. Note that the term "processor" refers to a processor with a single core or a processor package with multiple processor cores. In at least one embodiment, the computing system 600, or one or more components thereof, is representative of one or more components described hereby, such as data lineage tool 104, 204, 304, 404, lineage generator 310, parser 308, or dependency mapper 418. More generally, the computing system 600 is configured to implement all logic, systems, logic flows, methods, apparatuses, and functionality described hereby with reference to FIGS. 1-7. The embodiments are not limited in this context.

As used in this application, the terms "system" and "component" and "module" are intended to refer to a computer-related entity, either hardware, a combination of hardware and software, software, or software in execution, examples of which are provided by the exemplary system 600. For example, a component can be, but is not limited to being, a process running on a processor, a processor, a hard disk drive, multiple storage drives (of optical, solid-state, and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in this figure, system 600 comprises a motherboard or system-on-chip (SoC) 602 for mounting platform components. Motherboard or system-on-chip (SoC) 602 is a point-to-point (P2P) interconnect platform that includes a first processor 604 and a second processor 606 coupled via a point-to-point interconnect 670 such as an Ultra Path Interconnect (UPI). In many embodiments, the system 600 may be of another bus architecture, such as a multi-drop bus. Furthermore, each of processor 604 and processor 606 may be processor packages with multiple processor cores including core(s) 608 and core(s) 610, respectively. While the system 600 is an example of a two-socket (2S) platform, a variety of embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processor 604 and chipset 632. Some platforms may include additional components and some platforms may only include sockets to mount the processors and/or the chipset. Furthermore, some platforms may not have sockets (e.g. SoC, or the like).

The processor 604 and processor 606 can be any of various commercially available processors, including without limitation an Intel® processors; AMD® processors; ARM® application, embedded, and secure processors; IBM® processors; and similar processors. Dual microprocessors, multi-core processors, and other multi-processor architectures may also be employed as the processor 604 and/or processor 606. Additionally, the processor 604 need not be identical to processor 606.

Processor 604 includes an integrated memory controller (IMC) 620 and point-to-point (P2P) interface 624 and P2P interface 628. Similarly, the processor 606 includes an IMC 622 as well as P2P interface 626 and P2P interface 630. IMC 620 and IMC 622 couple the processors processor 604 and processor 606, respectively, to respective memories (e.g., memory 616 and memory 618). Memory 616 and memory 618 may be portions of the main memory (e.g., a dynamic random-access memory (DRAM)) for the platform such as double data rate type 3 (DDR3) or type 4 (DDR4) synchronous DRAM (SDRAM). In the present embodiment, the memories memory 616 and memory 618 locally attach to the respective processors (i.e., processor 604 and processor 606). In many embodiments, the main memory may couple with the processors via a bus and shared memory hub.

System 600 includes chipset 632 coupled to processor 604 and processor 606. Furthermore, chipset 632 can be coupled to storage device 650, for example, via an interface (I/F) 638. The I/F 638 may be, for example, a Peripheral Component Interconnect-enhanced (PCI-e). Storage device 650 can store instructions executable by circuitry of system 600 (e.g., processor 604, processor 606, GPU 648, ML accelerator 654, vision processing unit 656, or the like). For example, storage device 650 can store instructions for data lineage tool 204, query interpreter 316, data adjuster 306, dependency mapper 314, data evaluator 408, or the like. In another example, storage device 650 can store data, such as historical data 106, query data 210, or lineage data 420.

Processor 604 couples to a chipset 632 via P2P interface 628 and P2P 634 while processor 606 couples to a chipset 632 via P2P interface 630 and P2P 636. Direct media interface (DMI) 676 and DMI 678 may couple the P2P interface 628 and the P2P 634 and the P2P interface 630 and P2P 636, respectively. DMI 676 and DMI 678 may be a high-speed interconnect that facilitates, e.g., eight Giga Transfers per second (GT/s) such as DMI 3.0. In many embodiments, the processor 604 and processor 606 may interconnect via a bus.

The chipset 632 may comprise a controller hub such as a platform controller hub (PCH). The chipset 632 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In many embodiments, the chipset 632 may comprise more than one controller hub such as a chipset with a memory controller hub, a graphics controller hub, and an input/output (I/O) controller hub.

In the depicted example, chipset 632 couples with a trusted platform module (TPM) 644 and UEFI, BIOS, FLASH circuitry 646 via I/F 642. The TPM 644 is a dedicated microcontroller designed to secure hardware by integrating cryptographic keys into devices. The UEFI, BIOS, FLASH circuitry 646 may provide pre-boot code.

Furthermore, chipset 632 includes the I/F 638 to couple chipset 632 with a high-performance graphics engine, such as, graphics processing circuitry or a graphics processing unit (GPU) 648. In many embodiments, the system 600 may include a flexible display interface (FDI) (not shown) between the processor 604 and/or the processor 606 and the chipset 632. The FDI interconnects a graphics processor core in one or more of processor 604 and/or processor 606 with the chipset 632.

Additionally, ML accelerator 654 and/or vision processing unit 656 can be coupled to chipset 632 via I/F 638. ML accelerator 654 can be circuitry arranged to execute ML related operations (e.g., training, inference, etc.) for ML models. Likewise, vision processing unit 656 can be circuitry arranged to execute vision processing specific or related operations. In particular, ML accelerator 654 and/or vision processing unit 656 can be arranged to execute mathematical operations and/or operands useful for machine learning, neural network processing, artificial intelligence, vision processing, etc.

Various I/O devices 660 and display 652 couple to the bus 672, along with a bus bridge 658 which couples the bus 672 to a second bus 674 and an I/F 640 that connects the bus 672 with the chipset 632. In one embodiment, the second bus 674 may be a low pin count (LPC) bus. Various devices may couple to the second bus 674 including, for example, a keyboard 662, a mouse 664 and communication devices 666.

Furthermore, an audio I/O 668 may couple to second bus 674. Many of the I/O devices 660 and communication devices 666 may reside on the motherboard or system-on-chip (SoC) 602 while the keyboard 662 and the mouse 664 may be add-on peripherals. In many embodiments, some or all the I/O devices 660 and communication devices 666 are add-on peripherals and do not reside on the motherboard or system-on-chip (SoC) 602.

Figure 7:
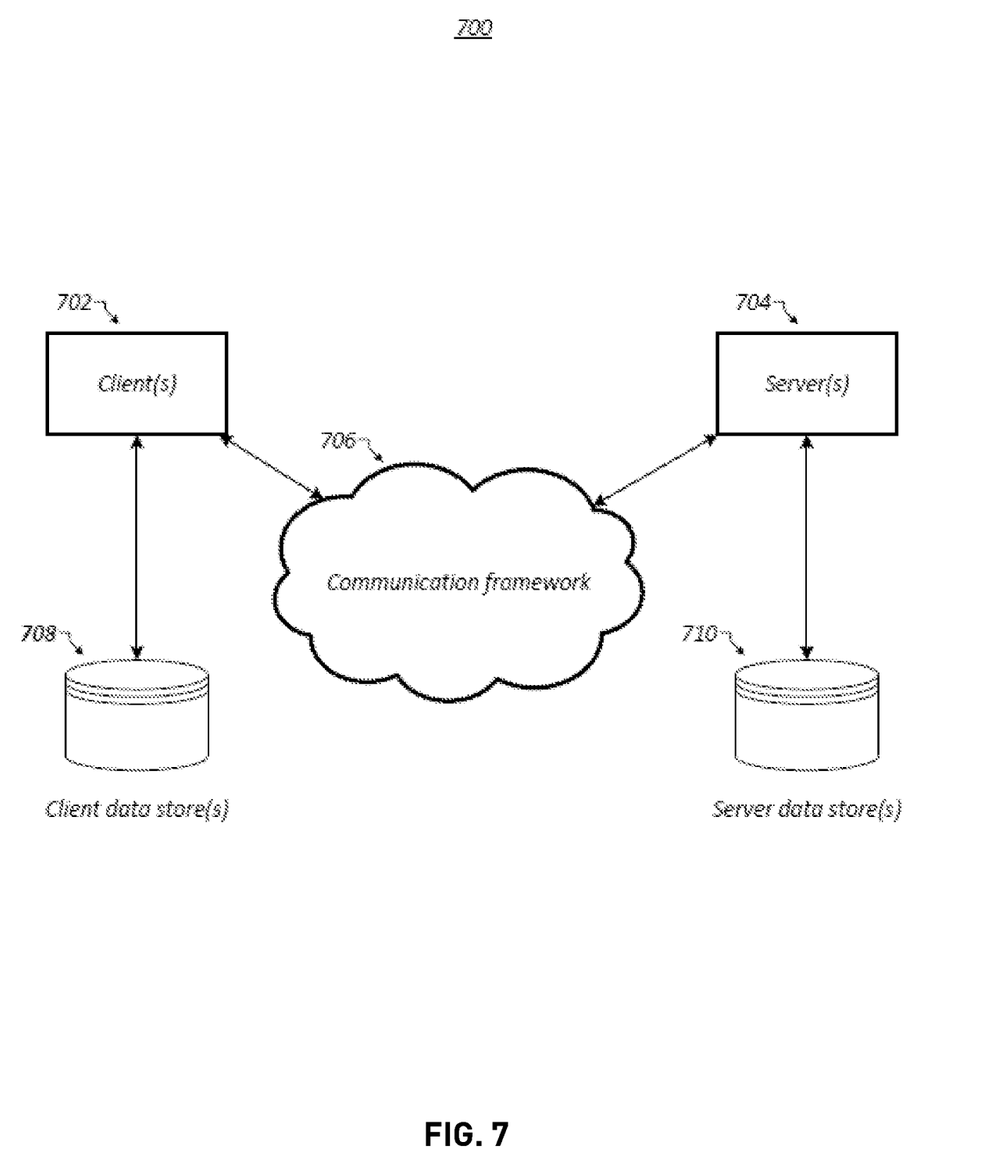
FIG. 7 illustrates exemplary aspects of a communications architecture according to one or more embodiments described hereby.

FIG. 7 illustrates a block diagram of an exemplary communications architecture 700 suitable for implementing various embodiments as previously described, such as communications between data lineage tool 104 and historical data 106. The communications architecture 700 includes various common communications elements, such as a transmitter, receiver, transceiver, radio, network interface, baseband processor, antenna, amplifiers, filters, power supplies, and so forth. The embodiments, however, are not limited to implementation by the communications architecture 700.

As shown in FIG. 7, the communications architecture 700 comprises includes one or more clients 702 and servers 704. In some embodiments, communications architecture may include or implement one or more portions of components, applications, and/or techniques described hereby. The clients 702 and the servers 704 are operatively connected to one or more respective client data stores 708 and server data stores 710 that can be employed to store information local to the respective clients 702 and servers 704, such as cookies and/or associated contextual information. In various embodiments, any one of servers 704 may implement one or more of logic flows or operations described hereby, such as in conjunction with storage of data received from any one of clients 702 on any of server data stores 710. In one or more embodiments, one or more of client data store(s) 708 or server data store(s) 710 may include memory accessible to one or more portions of components, applications, and/or techniques described hereby.

The clients 702 and the servers 704 may communicate information between each other using a communication framework 706. The communications framework 706 may implement any well-known communications techniques and protocols. The communications framework 706 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 706 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1900 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 702 and the servers 704. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described hereby. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated hereby.

What is claimed is:

1. An apparatus, comprising:
a processor; and
memory comprising instructions that when executed by the processor cause the processor to:
determine whether a first query is dependent on a historical query in historical data;
determine whether a historical lineage has been previously built for the historical query in the historical data;
responsive to the historical lineage being previously built for the historical query, fetch the historical lineage from the historical data;
build a data lineage for the first query by adding to the historical lineage to define upstream dependencies that capture relationships between and within the historical query and the first query for end-to-end lineage generation;
add metadata to the data lineage, the metadata comprising transformation logic associated with the first query; and
generate a data report using the data lineage to automatically identify any data inaccuracies and vulnerabilities.

2. The apparatus of claim 1, wherein the instructions, when executed by the processor, further cause the processor to:
determine whether the first query is dependent on a second query in the historical data;
determine whether a second lineage has been previously built for the second query in the historical data;
when the second lineage has been previously built for the second query, fetch the second lineage from the historical data; and
use the second lineage to build the data lineage.

3. The apparatus of claim 1, wherein the instructions, when executed by the processor, further cause the processor to merge the data lineage into a lineage graph comprising at least a portion of the historical lineage.

4. The apparatus of claim 1, wherein the instructions, when executed by the processor, further cause the processor to parse the first query to determine whether the first query is dependent on the historical query.

5. The apparatus of claim 1, wherein the instructions, when executed by the processor, further cause the processor to merge the data lineage, including the metadata added, into a lineage graph.

6. The apparatus of claim 1, wherein the first query comprises a structured query language (SQL) query.

7. At least one non-transitory computer-readable medium comprising a set of instructions that, in response to execution by a processor circuit, cause the processor circuit to:
determine whether a first query is dependent on a historical query in historical data;
determine whether a historical lineage has been previously built for the historical query in the historical data;
responsive to the historical lineage being previously built for the historical query, fetch the historical lineage from the historical data;
build a data lineage for the first query by adding to the historical lineage to define upstream dependencies that capture relationships between and within the historical query and the first query for end-to-end lineage generation;

add metadata to the data lineage, the metadata comprising transformation logic associated with the first query; and generate a data report using the data lineage to automatically identify any data inaccuracies and vulnerabilities.

8. The at least one non-transitory computer-readable medium of claim 7, wherein the set of instructions, in response to execution by the processor circuit, further cause the processor circuit to:

determine whether the first query is dependent on a second query in the historical data;

determine whether a second lineage has been previously built for the second query in the historical data;

when the second lineage has been previously built for the second query, fetch the second lineage from the historical data; and use the second lineage to build the data lineage.

9. The non-transitory computer-readable medium of claim 7, wherein the set of instructions, in response to execution by the processor circuit, further cause the processor circuit to merge the data lineage into a lineage graph comprising at least a portion of the historical lineage.

10. The non-transitory computer-readable medium of claim 7, wherein the set of instructions, in response to execution by the processor circuit, further cause the processor circuit to parse the first query to determine whether the first query is dependent on the historical query.

11. The non-transitory computer-readable medium of claim 7, wherein the set of instructions, in response to execution by the processor circuit, further cause the processor circuit to merge the data lineage, including the metadata added, into a lineage graph.

12. A computer-implemented method, comprising:

determining whether a first query is dependent on a historical query in historical data;

determining whether a historical lineage has been previously built for the historical query in the historical data;

responsive to the historical lineage being previously built for the historical query, fetching the historical lineage from the historical data;

building a data lineage for the first query by adding to the historical lineage to define upstream dependencies that capture relationships between and within the historical query and the first query for end-to-end lineage generation;

adding metadata to the data lineage, the metadata comprising transformation logic associated with the first query; and generating a data report using the data lineage to automatically identify any data inaccuracies and vulnerabilities.

13. The computer-implemented method of claim 12, comprising:

determining whether the first query is dependent on a second query in the historical data;

determining whether a second lineage has been previously built for the second query in the historical data;

when the second lineage has been previously built for the second query, fetching the second lineage from the historical data; and using the second lineage to build the data lineage.

14. The apparatus of claim 1, wherein the instructions, when executed by the processor, further cause the processor to build the data lineage based on at least one conditional statement in the first query, the at least one conditional statement comprising one or more of a 'where' clause or a 'group by' clause.

15. The non-transitory computer-readable medium of claim 7, wherein the set of instructions, in response to execution by the processor circuit, further cause the processor circuit to build the data lineage based on at least one conditional statement in the second first query, the at least one conditional statement comprising one or more of a 'where' clause or a 'group by' clause.

16. The computer-implemented method of claim 12, comprising:

building the data lineage based on at least one conditional statement in the first query, the at least one conditional statement comprising one or more of a 'where' clause or a 'group by' clause.

* * * * *